No. 871,617. PATENTED NOV. 19, 1907.
J. C. OESTERGARD.
IMPLEMENT TO ARREST THE FLOW OF WATER ON SIDEHILLS.
APPLICATION FILED FEB. 11, 1907.
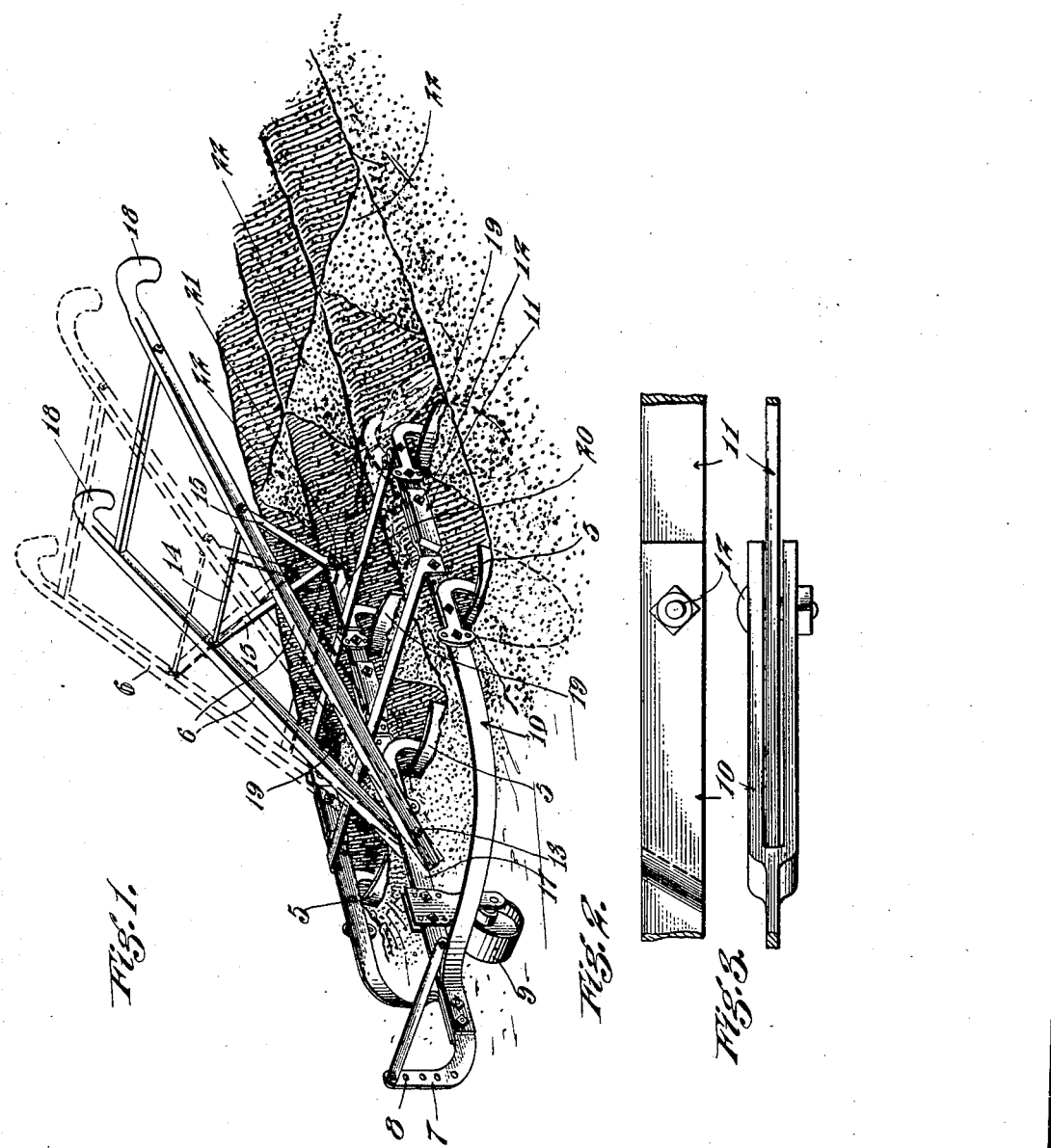
Witnesses
Inventor
Jens C. Oestergard
By Hazard & Strauss
Attorneys

UNITED STATES PATENT OFFICE.

JENS C. OESTERGARD, OF BURBANK, CALIFORNIA.

IMPLEMENT TO ARREST THE FLOW OF WATER ON SIDEHILLS.

No. 871,617.  Specification of Letters Patent.  Patented Nov. 19, 1907.

Application filed February 11, 1907. Serial No. 356,679

*To all whom it may concern:*

Be it known that I, JENS C. OESTERGARD, a citizen of the United States, residing at Burbank, in the county of Los Angeles and State of California, have invented new and useful Improvements in Implements to Arrest the Flow of Water on Sidehills, of which the following is a specification.

The object of my invention is to provide an implement, simple in construction and easily manipulated by means of which a cultivated side hill may have mutilated furrows placed therein whereby the storm water, which usually, under ordinary conditions, carries the soil down with it, may be prevented from running down the side hill and cause it to soak into and moisten the ground, instead of making large and injurious furrows therein. I accomplish this object by means of the device described herein and shown in the accompanying drawings, in which:—

Figure 1—is a perspective view of a device embodying my invention in place in the ground—the full lines in the drawings showing the position of the implement when the furrows are made, and the dotted lines showing the position into which the handle and the rear member of the device is thrown, when it is desired to mutilate or make fills in the furrows made by the front members. Figs. 2 and 3— are details of construction.

The cultivation of land on a side hill or in situations where the surface of the ground is uneven is attended with considerable difficulty and expense and more or less impracticable, owing to the fact that during rain storms often large quantities of water fall in a short period of time and form into rivulets and run down the side hill, carrying off the soil and making large ruts and ravines therein and the same thing occurs when water to irrigate is turned onto sideling ground.

The purpose of my invention is to provide an implement by means of which furrows can be made in the ground in a direction most calculated to intercept the flow of the surface water down hill, and to fill up or check these furrows at short intervals with soil thereby preventing the water from following down the furrow and creating ruts in the side hill. This device is illustrated in the drawings in which 4 represents the front frame of the device, 5 the front shares thereon and 6 are the handle bars. In the fore end of the frame is the bracket 7 having a plurality of openings 8 therein for the attachment to the device of the double trees. Rotatably mounted in the front end of the frame is the usual guide wheel 9.

The device is constructed of the forward member 10 and a rear member 11, the forward member having three shares 5 adjustably attached thereto and the rear member swingingly connected therewith (having three shares 19) by means of the bolts 12. It will be observed that the front shares 5 are slightly convex and have an inclination forwardly looking downwardly thereon, while rear shares 19 are slightly concave, and are mounted in a vertical position, the purpose of which is to throw the soil in front of the front shares on either side thereof and make a furrow, while the rear shares being slightly concave and stand nearly vertical push the loose soil or dirt in the furrow along in front of the shares and by elevating them the accumulated soil in front thereof will be left in the furrows to form fills or checks 22. The front end of the handle bars are pivotally secured by the bolt 13 to the central member 17 of the frame of the front member, and extend rearwardly and upwardly therefrom and terminate in the usual handles 18. Secured approximately in the center of the handle bars by the cross bolts 14, is the forked support 15, the lower end of which is secured to the rear end of the central bar 20 by the bolt 21. The rear member of the device, carrying the three shares, is pivotally secured to the front member by the three connecting bolts 12. This will permit the rear end of the rear member to be elevated sufficiently far to raise the shares on the rear member out of the ground, leaving the accumulated soil in front of them in the furrows. When the furrows made by the front shares are sufficiently filled with the soil banking up in front of the shares on the rear member, these shares are elevated out of the ground by elevating the handle bars into the position shown in dotted lines in Fig. 1. This will leave a check or fill 22 in each furrow properly spaced apart and prevent the water from following along in the furrows. The furrows between these fills will form catchment basins to catch and hold the water, permitting it to soak into the ground and not run off, thereby irrigating the soil and preventing furrows being made therein by storm water or water turned thereon for irrigating purposes.

Having described my invention what I claim as new and desire to secure by Letters Patent is:—

1. An implement, comprising a forward and rear member, the front member provided with a set of furrow making shares; a set of furrow filling shares on the rear member arranged to follow in the furrows made by the shares on the front member, the members pivotally secured together; and means to throw the rear shares into and out of the furrows.

2. An implement to make checked furrows, comprising a front member and a rear member pivotally secured together; shares on the front member adapted to throw the soil on either side thereof and make furrows; shares on the rear member adapted to follow in the furrow made by the shares on the front member, and fill the furrows made by the front member at intervals; handles pivotally secured at their front ends to the front member and pivotally connected with the rear end of the rear member.

3. A mutilated furrow-making implement, comprising a forward and a rear member pivotally connected together; shares on the front member projecting forwardly and downwardly and being convex on their front faces; a like number of shares on the rear member projecting downwardly therefrom and being concave on their front faces; handles pivotally secured at their front ends to the front member and workably secured to the rear end of the rear member.

In witness that I claim the foregoing I have hereunto subscribed my name this 2nd day of February, 1907.

JENS C. OESTERGARD.

Witnesses:
 HENRY T. HAZARD,
 EDMUND A. STRAUSE.